May 12, 1970     A. C. PEASE ET AL     3,511,337

GAS TURBINE NOISE ATTENUATOR

Filed Jan. 16, 1968     2 Sheets-Sheet 1

INVENTOR.
ALVAH C. PEASE
BY HOWARD K. PELTON

Eli Wei
ATTORNEY

May 12, 1970  A. C. PEASE ET AL  3,511,337
GAS TURBINE NOISE ATTENUATOR

Filed Jan. 16, 1968  2 Sheets-Sheet 2

INVENTOR.
ALVAH C. PEASE
BY HOWARD K. PELTON

Eli Weiss
ATTORNEY 3,511,337
Patented May 12, 1970

3,511,337
GAS TURBINE NOISE ATTENUATOR
Alvah C. Pease, and Howard King Pelton, Shreveport, La., assignors to American Machine & Foundry Company, a corporation of New Jersey
Filed Jan. 16, 1968, Ser. No. 698,290
Int. Cl. F01n 3/04, 1/14
U.S. Cl. 181—52                    11 Claims

ABSTRACT OF THE DISCLOSURE

This invention relates to a noise attenuator which can be used in combination with an air conditioning or air processing means to reduce the intake noise of a gas turbine, the attenuation being effected by means of sound absorbing plates having offset sections to form a bend for noise paths.

This invention relates generally to a gas turbine engine noise attenuator and more specifically to a noise attenuator for the intake of a gas turbine which can be used in combination with an air conditioning means.

It is an object of this invention to provide a gas turbine intake noise attenuator.

It is another object of this invention to provide a gas turbine intake noise attenuator which has low turbulence and does not introduce an undesirable pressure drop.

It is still another object of this invention to provide a gas turbine intake noise attenuator which operates in combination with an air conditioning means.

It is also an object of this invention to provide a device which is economical to build and efficient in operation.

Other objects and many of the attendant advantages of this invention will be readily appreciated as the apparatus becomes better understood by reference to the following detailed description when considered in connection with the accompanying drawings wherein.

Similar reference characters refer to similar parts throughout the several views of the drawings.

In this invention, a noise attenuator which can be used in combination with an air conditioning means is coupled to the intake of a gas turbine to condition the air fed to the gas turbine and to reduce turbine intake noise. Turbine intake noise can consist of mechanical whine and rumble, and air moving sounds.

Figure 1:
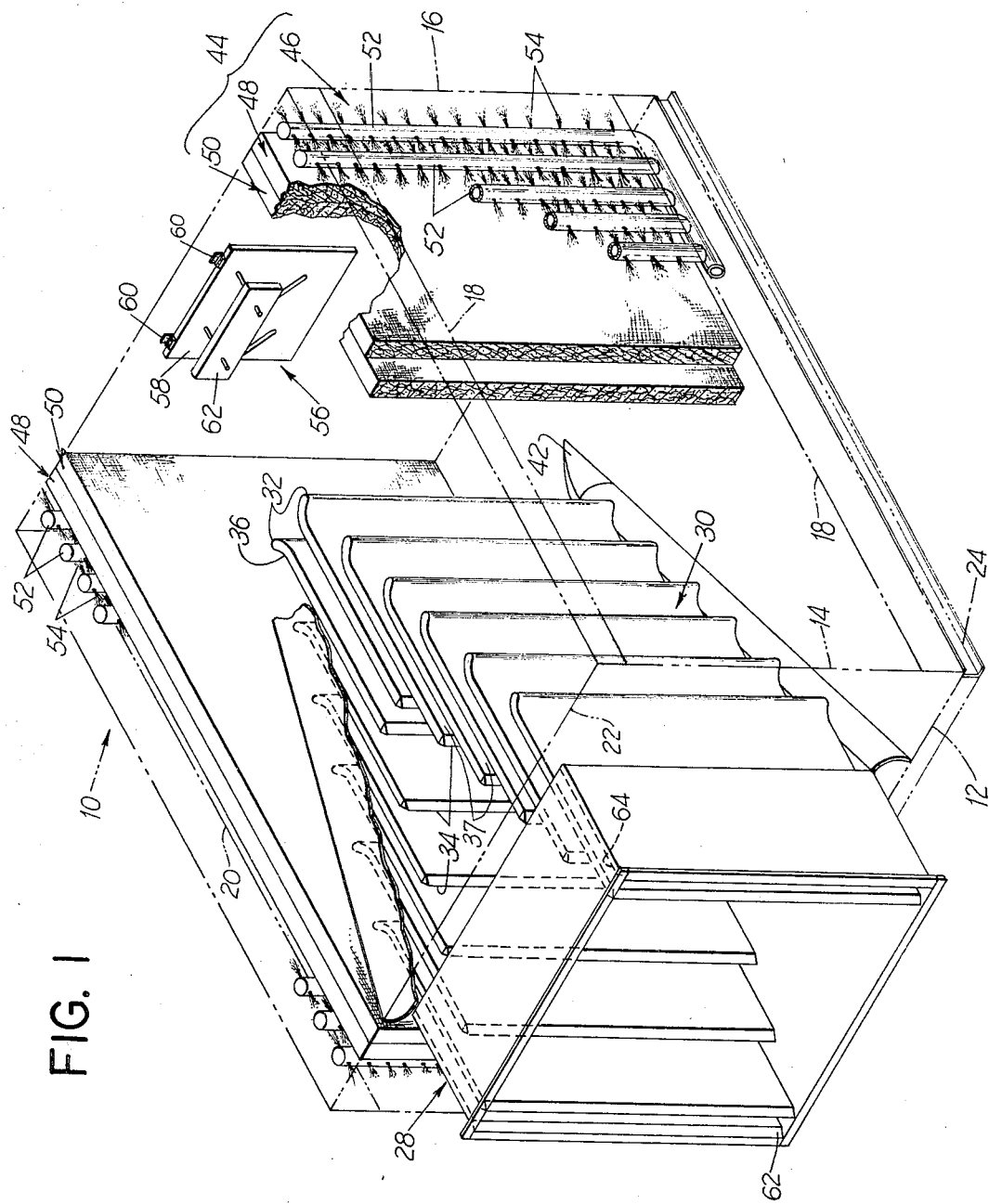
FIG. 1 is a perspective view of structure in accordance with the principles of this invention.

Referring to FIG. 1, there is illustrated structure built in accordance with the principles of this invention. A base member 12, two end members 14, 16; two side members 18, 20; and a top member 22 are coupled together to form a box like structure 10. The base member 12, composed of rust resistant material such as aluminum, galvanized iron, stainless steel or the like is secured to supports such as channel members or I beams 24 which are sized to suit the specific height and structural requirements desired.

The end member 14 which is also composed of rust resistant material such as aluminum, galvanized iron, stainless steel or the like supports a cutout 26 around which is positioned a sleeve or air discharge port 28. The sleeve 28 is composed of rust resistant material and is designed and sized to handle the intake air of a gas turbine, and then in turn is coupled to the turbine by means of a transition piece.

Within the box like structure 10 and partially within the discharge port 28 is a plurality of staggered vertically oriented, parallel positioned splitter panels 30. The splitter panels have rounded leading edges 32 and tapered trailing edges 34, both of which contribute to improved air flow by helping to reduce turbulence.

Each of the panels of the plurality of panels 30 are similar in design and construction. Each panel is composed of structural members or ribs of corrosion resistant material such as galvanized steel or stainless steel or the like strategically positioned to provide structural strength and stability to the finished panel. Where the structural member or rib is made of galvanized steel, a thickness of 16 gage was found to be adequate. Acoustical packing material such as glass wool or the like which can be in the form of a soft flexible blanket or a semi-rigid board is positioned between the structural channels or ribs. A semi-rigid board of acoustical packing material having a density which can vary from four to six pounds per cubic foot was found to give good results.

The structural members and acoustical material is covered with or sandwiched between two perforated sheet members composed of corrosion resistant material. In those instances where the perforated sheet members are composed of galvanized steel, a thickness of 16 gage was found to be adequate. To avoid the possibility of contaminating the air stream passing over the panel with particles from the acoustical material, a retaining member such as a layer of glass cloth or the like can be positioned immediately behind the perforated sheet members. If desired, the containment of the acoustical material can be insured by wrapping the glass cloth around the acoustical material. The panel is of all welded construction.

The forward or leading end 36 of the panels contain an offset section which is in the shape of an arc of a circle having a relatively large diameter, or a straight section angled slightly relative to the main body of the panel. The forward end or tip 32 of the offset section 36 projects beyond and overlaps the projection of the plane within which the body 35 of an adjacent panel 30 lies. The offset section forms a bend in the path between its associated panel and an adjacent panel to reduce the possibility of turbine intake noise passing, in an uninterrupted manner, straight through the space 37 between the splitter panels.

When a gas turbine of the Westinghouse type having a capacity of 30 megawatts is coupled to receive intake air from the invention herein described, good results were obtained using splitter panels having a thickness of four inches, a length of ten feet and offset section 36 being arcs of relatively short length and relatively large diameters, the length of the arcs being sufficient to form a bend in the path between two adjacent sound absorbing panels. The splitter panels being spaced on eight inch centers.

Figure 2:
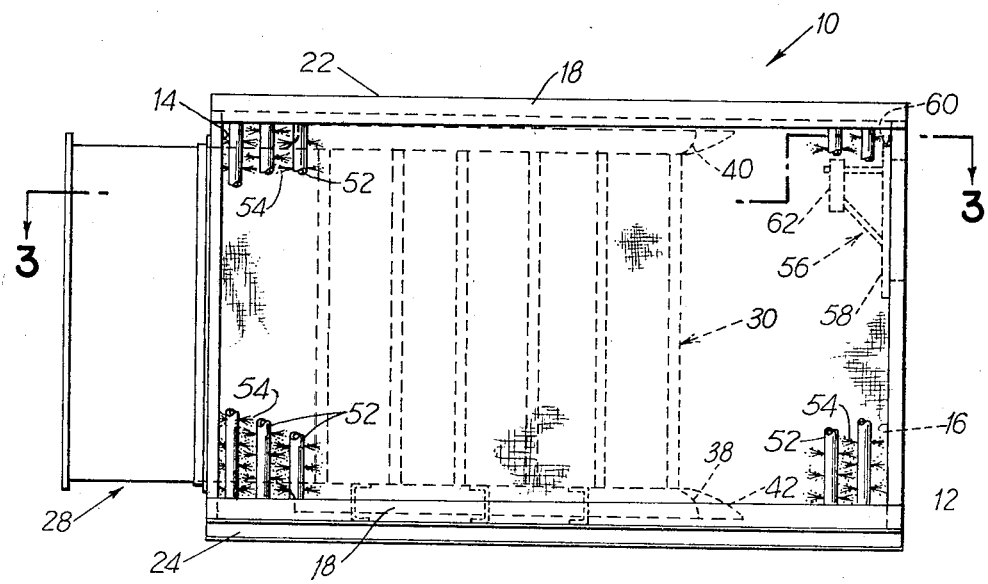
FIG. 2 is a view in elevation of structure in accordance with the principles of this invention.

The splitter panels 30 are positioned within the box like structure 10 and are secured at their bottom through a scoop member such as a curved plate 38 to the base member 12, and at their top through a scoop member such as a curved plate 40 to the top member 22 by welding. The curved plates 38 and 40 aid in reducing the pressure drop and, additionally, plate 38 more effectively helps in scooping the cooler air off the floor or base member 12. The scoop members are shaped at their front end 42 to provide a convex snow plow type of shape; or, if desired, the front end 42 can be shaped to present a concave configuration. FIG. 2 illustrates the scoop members 38 and 40 located at the bottom and top respectively of the sound absorbing plates.

The splitter panels 30 are progressively displaced back on each side of a centrally positioned panel to provide a stepped array of splitter panels. This stepped array helps reduce the entrance losses of passing air.

Figure 3:
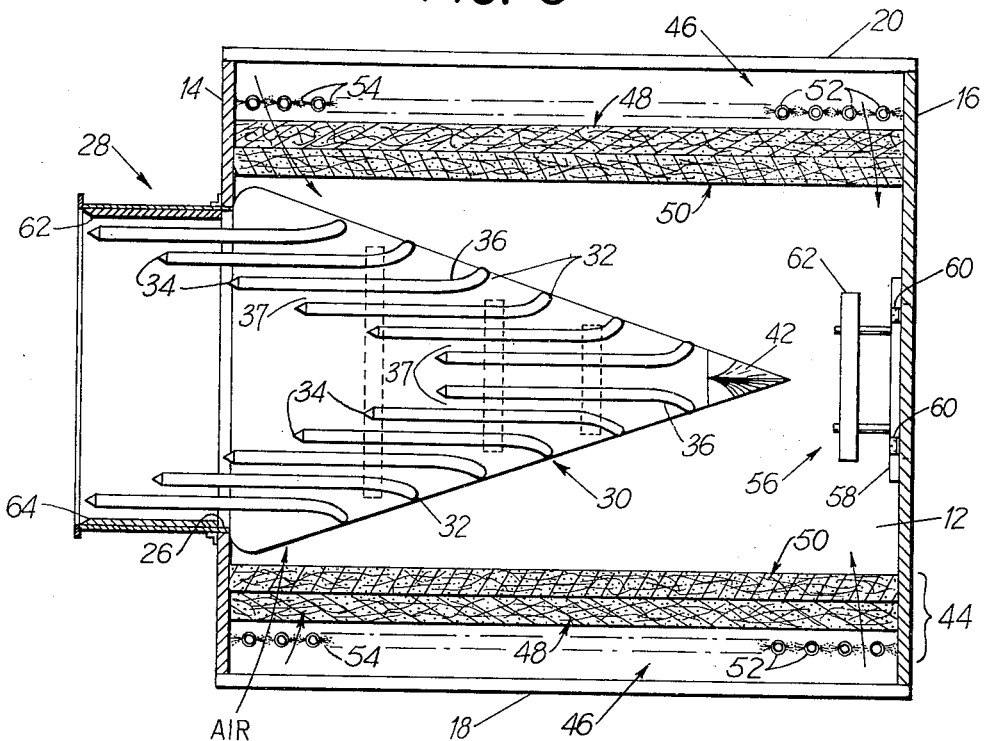
FIG. 3 is a view along the line 3—3 of FIG. 2.

Referring now to FIGS. 1 and 3, the evaporative cooling section 44 can comprise a cooling and wetting section 46; a demister section 48; and a filter section 50.

The cooling and wetting section can consist of a plurality of vertically or horizontally positioned pipes 52 having spray or mist forming orifice oriented to create a wall of water mist 54 through which the air must pass. As the air passes through the wall of water mist 54, it is cooled and its relative humidity is greatly increased.

The cooled and moistened air from the cooling and wetting section is then fed through the demister section 48 which removes some of the water vapor from the cooled air. The demister section 48 is made up of stationary glass wool pads, or blankets, stationary nylon fibres, nylon fibres wound back and forth between two end discs to form a cylinder which is rotatably driven, and the like.

The cooled and relatively dry air from the demister section 48 is fed through the filter section 50 which helps remove particles of dirt which may still be present in the air.

The cooled, relatively dry and clean air which flows from the filter section 50 is fed to the plurality of sound absorbing splitter panels.

Under some circumstances it is possible to obtain a condition where the air flow through the evaporative cooling sections 44 can be partially or fully blocked. One such common condition can be where the filter section 50 becomes saturated with dirt. To avoid the possibility of starving an associated gas turbine of its intake air during operation as a result of a blockage of air through the evaporative cooling section 44, an air by-pass means such as an implosion door 56 is provided.

The implosion door 56 can consist of a door 58 mounted on top positioned inwardly swinging hinges 60; a weight 62 being mounted to the door 58 to provide a continuous closing torque. In operation, a decrease of pressure within the box like structure 10 which is greater than that desired will result in atmospheric pressure acting against the closing torque of the weight 62 sufficient to open door 58 and permit air to by-pass the evaporative cooling section 44 and flow directly to the sound absorbing splitter panels.

If desired, sound absorbing material can be applied to the inside of the back wall 16 of the box like structure 10 and to the inside of the four walls of the air discharge port 28. In FIG. 1, sound absorbing material 62, 64 is shown as having been applied to the inside of the vertical walls of the air discharge port 28.

Obviously many modifications and variations of the present invention are possible in the light of the above teachings. It is, therefore, to be understood that the invention may be practiced otherwise than as specifically described herein.

What is claimed is:

1. Noise attenuation apparatus for the intake of a gas turbine comprising an air discharge port for coupling to the intake of a gas turbine, a plurality of continuous sound absorbing plates positioned along planes substantially parallel to each other to form straight line paths for channelling air to said air discharge port, an offset section coupled to the leading end of each of the continuous sound absorbing plates to form a bend in the air path between said plurality of said sound absorbing plates, and positioning the trailing ends of said plurality of sound absorbing plates in staggered relationship relative to each other.

2. The combination of claim 1 wherein said sound absorbing plates comprises a first side surface having perforations, a second side surface having perforations, and acoustical material positioned between said first and second side surfaces.

3. The combination of claim 2 wherein said acoustical material comprises glass wool having a density from four to six pounds per cubic foot.

4. The combination of claim 3 including a layer of glass cloth between said side surfaces and said acoustical material.

5. The combination of claim 2 including a base coupled to cover the bottom ends of said sound absorbing plates, and a top coupled to cover the top ends of said sound absorbing plates.

6. The combination of claim 5 including a ramp interposed between said base and said bottom ends of said sound absorbing plates to scoop air off said base, and a ramp interposed between said top and said top ends of said sound absorbing plates to scoop air off said top.

7. Noise attenuation apparatus for the intake of a gas turbine comprising an air discharge port for coupling to the intake of a gas turbine, a plurality of continuous sound absorbing plates positioned along planes substantially parallel to each other to form straight line paths for channelling air to said air discharge port, an offset section coupled to the leading end of each of the continuous sound absorbing plates to form a bend in the air path between said plurality of said sound absorbing plates, and evaporative cooling means to condition the air fed to said plurality of sound absorbing plates and through said air discharge port.

8. The combination of claim 7 wherein said evaporative cooling means comprises a cooling and wetting means to cool the air by water evaporation, a demister means to remove moisture from the cooled air, and filter means to clean the cooled air.

9. The combination of claim 7 including means to selectively enable air to said sound absorbing plates to by-pass said inoperative cooling means.

10. Noise attenuation apparatus for the intake of a gas turbine comprising a housing having a first end, a second end, first and second sides coupled to said first and second ends, a top coupled to said sides and ends, and a bottom coupled to said sides and ends, an air discharge port coupled to said first end, a plurality of sound absorbing plates positioned along planes parallel to each other interposed between said top and said bottom to direct air through said air discharge port, said sound absorbing plates having offset means to form a bend in the path between said plurality of sound absorbing plates, and evaporative cooling means forming said first and second sides to condition the air fed to said plurality of sound absorbing plates.

11. The combination of claim 10 including means to selectively enable air to said sound absorbing plates to by-pass said evaporative cooling means.

References Cited

UNITED STATES PATENTS 2,685,936  8/1954  Brenneman et al.
3,011,584  12/1961  Lemmerman et al.

FOREIGN PATENTS 221,224  2/1954  Australia.
670,930  4/1952  Great Britain.

ROBERT S. WARD, Jr., Primary Examiner

U.S. Cl. X.R.

181—56